United States Patent [19]

Anayama

[11] Patent Number: 4,865,769
[45] Date of Patent: Sep. 12, 1989

[54] RADIATION SHIELDING MATERIAL AND PROCESS FOR PREPARING THE SAME

[75] Inventor: Yoshimasa Anayama, Kawasaki, Japan

[73] Assignee: Sanoya Industries Co., Ltd., Kanuma, Japan

[21] Appl. No.: 281,084

[22] Filed: Dec. 7, 1988

[51] Int. Cl.⁴ .................. C04B 35/68; C09K 3/00; G21C 5/12; G21C 7/24

[52] U.S. Cl. .................. 252/478; 250/515.1; 250/517.1; 250/518.1; 376/339; 376/419

[58] Field of Search .............. 252/478, 628, 629; 376/339, 419; 423/561.1, 620, 520; 250/506.1, 505.1, 515.1, 518.1

[56] References Cited

U.S. PATENT DOCUMENTS

| | | |
|---|---|---|
| 1,278,010 | 9/1918 | Poetschke .................. 252/478 |
| 3,751,387 | 8/1973 | Hall et al. .................. 252/478 |
| 4,261,756 | 4/1981 | Bernstein .................. 252/478 |
| 4,608,352 | 8/1986 | Laurent et al. .................. 252/478 |
| 4,753,756 | 6/1988 | Anayama .................. 252/478 |

FOREIGN PATENT DOCUMENTS

| | | | |
|---|---|---|---|
| 2567677 | 1/1986 | France .................. 250/515.1 |
| 2012895 | 1/1987 | Japan .................. 250/518.1 |
| 45911 | 6/1962 | Poland .................. 252/478 |
| 1005196 | 9/1965 | United Kingdom .................. 252/478 |

Primary Examiner—Howard J. Locker
Attorney, Agent, or Firm—Bucknam and Archer

[57] ABSTRACT

A radiation shielding material for intercepting not only γ rays and x rays but also neutrons, comprising sulfur, iron oxide powder, lead oxide powder, gadolinium oxide powder and hydrogen-occluding alloy powder; and a process for preparing the radiation shielding material.

3 Claims, 2 Drawing Sheets

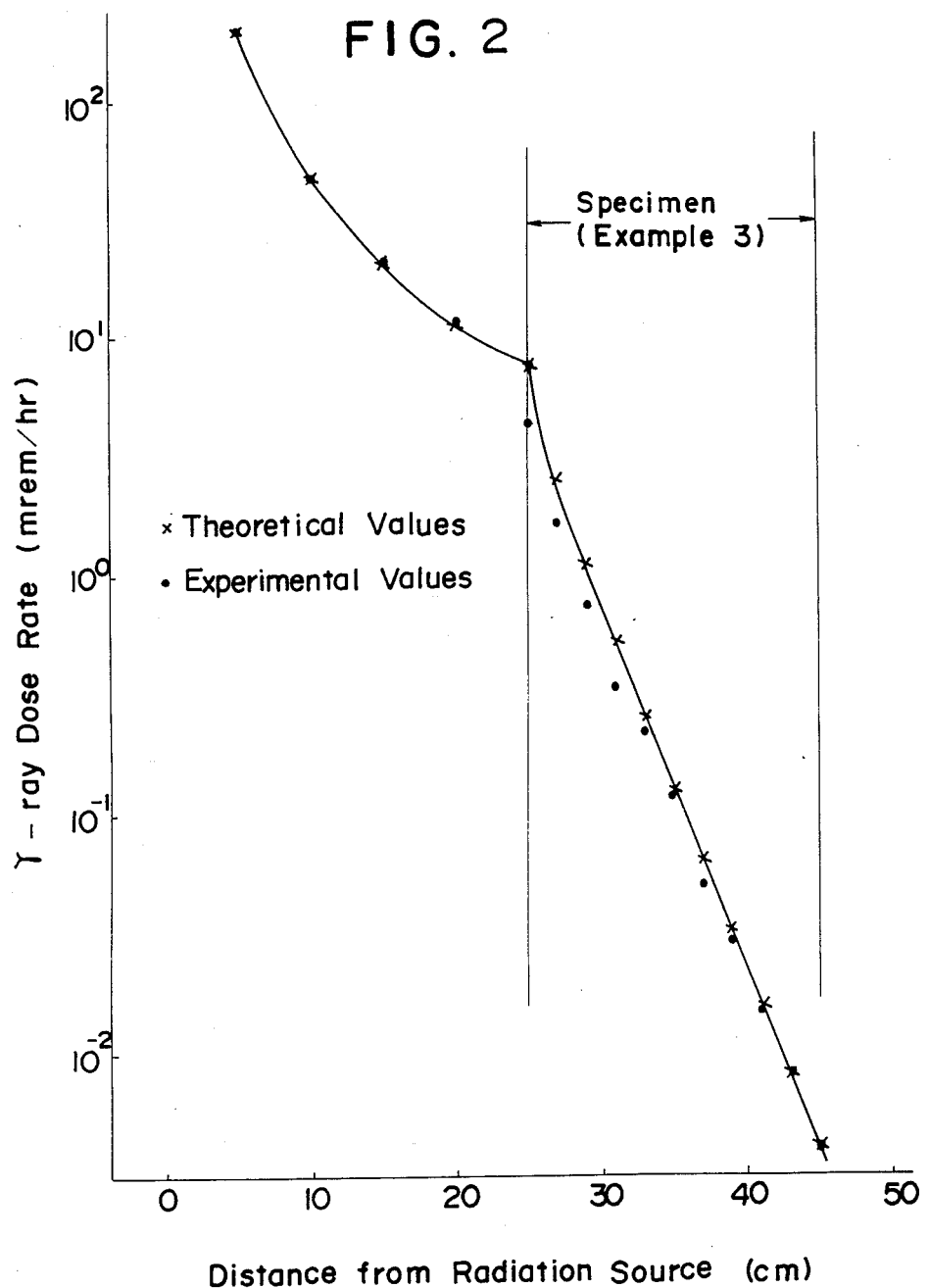

RADIATION SHIELDING MATERIAL AND PROCESS FOR PREPARING THE SAME

BACKGROUND OF THE INVENTION (1) Field of the Invention

This invention relates to a radiation shielding material suitable for simultaneously intercepting α, β, γ and x rays as well as neutrons and also relates to a process for preparing the radiation shielding material.

(2) Prior Art

In a process for intercepting (shielding from) radiation, radiation to be taken into account may mainly be γ rays, x rays and neutrons. In a case where α rays and β rays are accompanied by γ rays and x rays, a shielding material which is capable of intercepting γ rays, x rays and neutrons will of course be also capable of intercepting α rays and β rays.

Thus, massive substances, such as concrete, lead plates, lead blocks and iron plates, have heretofore been used as construction materials for intercepting (shielding from) γ rays and x rays.

Neutrons have a very wide variety of energy, are therefore complicated and show reactions such as elastic scattering, non-elastic scattering and neutron capture. Thus, water, paraffin, polyethylene and the like which have a high hydrogen content, are used as a retarder for neutron velocity generated by elastic scattering, while concrete and lead which are massive are used because of the emission of γ rays in case of non-elastic scattering. In addition, since highly penetrable γ rays are generated by the emission of other particles and photons due to neutron capture, it is necessary to use a massive substance in order to intercept such γ rays. More particularly, since neutrons hardly constitute a single source of radiation and, in many cases, they are accompanied with γ rays, interception of γ rays must also be taken into account in case of interception of neutrons. Accordingly, a radiation shield is composed not only of a shielding component such as concrete, iron, lead or the like but also of another shielding component such as water, paraffin, polyethylene or the like.

Further, in an installation wherein radiation is handled, a concrete construction absorbs water contaminated with radioactivity because of its water absorbability, and it is very difficult to wash and clean the thus contaminated concrete construction. Thus, the concrete construction has actually been coated on the surface with a water-proof paint or a polymer thereby to enhance the concrete in hydrophobicity, but the concrete construction so coated is very expensive. Moreover, it is necessary that a large quantity of water be completely controlled without its leakage and that combustible materials, such as paraffin and polyethylene, be thoroughly controlled from the viewpoint of fire prevention.

It is necessary that the aforesaid concrete or iron construction have both a strength required as such and a considerable wall thickness in proportion to the dose of radiation; thus, the construction comes to be a very heavy structure. Lead is an excellent shielding material, but it is, per se, unsuitable for use as a material for a construction because of being a soft material and is therefore required to be used with a concrete or iron construction with the result of a high construction cost being needed. Further, it needs a special water tank, paraffin-made container and the like to intercept neutrons. In this case, particularly the water tank should be given close attention and brought under control to absolutely eliminate leakage from the water tank, and it is thought desirable that the water used be almost pure water containing none of heavy metal ions and the like. It is also necessary to pay close attention particularly to heat resistance and fire prevention since paraffin and polyethylene are apt to melt and ignite at comparatively low temperatures.

Accordingly, it needs a very complicated and expensive installation to intercept γ rays, x rays and neutrons at the same time. In addition, it is necessary that concrete be waterproofed in a special way because of its high water absorbability.

SUMMARY OF THE INVENTION

An object of this invention is to provide a radiation shielding material which has no conventional drawbacks, sufficient strength, excellent moldability and workability, capability of intercepting γ rays, x rays and neutrons at the same time, high hydrophobicity, excellent resistance to chemicals, high applicability, availability at low costs and wide applications.

Another object is to provide a process for preparing the radiation shielding material.

The radiation shielding material of this invention comprises sulfur, $Fe_2O_3$, $Pb_2O_3$, $Gd_2O_3$ and a hydrogen-adsorption alloy.

As mentioned above, the radiation shielding material of this invention comprises sulfur, iron oxide (III), lead oxide (III), gadolinium oxide (III) and a hydrogen-occluding alloy. The shielding material contains preferably 18.5–31.5 wt.%, more preferably 19.5–26.5 wt.%, of sulfur; preferably 12.5–22.5 wt.%, more preferably 13.5–18.5 wt.%, of $Fe_2O_3$; preferably 38.0–40.0 wt.%, more preferably 38.5–39.0 wt.%, of $Pb_2O_3$; preferably 5.5–16.0 wt.%, more preferably 9.0–15.0 wt.%, of $Gd_2O_3$; and preferably 2.5–14.0 wt.%, more preferably 7.5–13.0 wt.%, of a hydrogen-adsorption alloy. The shielding material having the above composition is excellently effective in intercepting radiation.

The hydrogen-adsorption alloy used herein includes MgCa, $Mg_2Ni$, $Mg_2Cu$ and $Mg_2LaNi$ with $Mg_2Ni$ being particularly preferred.

It is also effective to add to the radiation shielding material of this invention boron oxide, boron carbide and the like which are considered effective for shielding from neutrons. The amount of each of these compounds added varies depending on the dosage of a source of radiation, but it is suitably several wt.% for example as far as it can be contained in the matrix.

The lead oxide contained in the shielding material of this invention is effective in intercepting γ and x rays, while the iron-lead oxides contained in the shielding material intercept γ rays emitted when they reduce the velocity of neutrons by non-elastic collision of the neutrons with the oxides, and said iron-lead oxides also intercept γ rays generated when photons are emitted by neutron capture. In addition, the gadolinium oxide having a large cross-sectional coefficient and the hydrogen-adsorption alloy the hydrogen of which is the most effective in weakening neutrons, intercept neutrons which have come to have an energy of about 0.5 MeV.

Then, a preferred method for the preparation of the radiation shielding material of this invention will be explained hereunder.

First of all, sulfur is melted at 150°–410° C., iron oxide powder is mixed and melted with the melted sulfur, and the resulting melted mixture is thoroughly reacted thereby to make an inorganic matrix.

The sulfur used herein is one which is used as a solvent for lead oxide The sulfur has high covalent bondability when melted, brings about an equilibrium with monoclinic sulfur produced therefrom and produces crown-like $S_8$ ring molecules when reacted and is then subjected to a melt reaction at $300° ± 5°$ C. until the end of the melt reaction, after which the sulfur so far treated is cast in a cooled mold thereby producing rubbery sulfur which is very useful as a somewhat elastic matrix and is industrially easily available. The thus treated sulfur may be in the form of blocks, powder or flakes; particularly, such sulfur obtained as a by-product from petroleum refineries is inexpensive and suitable.

The iron oxide powder as one of the components of the shielding material of this invention, which is used as a matrix for the melt, is of industrial grade in purity and has a particle size of preferably 150–300 mesh in order to enable it to thoroughly react with the sulfur.

The suitable time for reaction between the iron oxide powder and the sulfur is 20–30 minutes.

According to this invention, the thus obtained melt (inorganic matrix) composed of the iron oxide powder and the sulfur is incorporated with lead oxide powder, gadolinium oxide powder and hydrogen-occluding alloy powder in the respective predetermined ratios, after which the melt and these oxide powders are mixed together thereby to obtain a melt mixture The lead oxide powder used here is of industrial grade and has a particle size of preferably about 300 mesh −4 mesh.

The gadolinium oxide powder used herein is of industrial grade in purity and has a particle size of preferably 150–270 mesh.

The hydrogen-adsorption alloy used herein is not particularly necessarily to sieved out for gradation in size since a starting alloy for the hydrogen-adsorption alloy will of itself be pulverized into particles when it has been hydrogenated, but the hydrogen-adsorption alloy has a particle size of preferably 32–270 mesh.

The said melt mixture is cast while it has a viscosity of 100,000–1,000,000 centipoise, after which the melt mixture so cast is cooled for solidification thereby obtaining various shaped articles, such as plates, blocks or cylinders, depending on the use of the articles.

The reason why the radiation shielding material of this invention is very effective in intercepting radiation, is as follows.

To the shielding effect of the radiation shielding material of this invention is generally applicable a mass law represented by the formula $$I = BI_o e^{-\mu x}$$

wherein I is the intensity of γ rays after their transmittance through the radiation shielding material, $I_o$ is the intensity of incident γ rays, $\mu$ is a linear absorption coefficient relating to the substance of the radiation shielding material, and x is the thickness of the shielding material; it has been considered that, in general, the shielding effect of a material is approximately proportioned to the magnitude of density of the material, this being applicable to any materials if they are of the same thickness.

Since the radiation shielding material of this invention is sufficiently isotropic, ions produced by the impingement of radiation on a radiation shielding material proceed along a zigzag orbit due to Rutherford scattering from the microscopic standpoint, while they are considered to proceed approximately rectilinearly from the macroscopic standpoint, and the ions proceeding rectilinearly are considered to rapidly lose their energy. The shielding material of this invention is considered to have a great resistance dE/dZ, that is a great friction force (F), against said rapid loss of energy. The original energy (E) of γ rays may change to another energy (E') by Compton scattering (effect) The reason for this is considered to be that γ ray beams and γ rays emitted from neutrons impinge upon the shielding material of this invention and photoelectric effects take place whereby the intensity of the beams is decreased and the γ rays are gradually lost.

Neutrons are decelerated by the non-elastic collision with the heavy metal elements contained in the shielding material of this invention thus to have an energy of about 0.5 MeV, and then decelerated by the elastic scattering with the hydrogen of the hydrogen-adsorption alloy contained in the shielding material thus to be changing to slow neutrons. Thermal neutrons are absorbed by the gadolinium having a great section coefficient (43.430 b/atom) contained in the shielding material of this invention. On the other hand, high energy γ rays emitted by the non-elastic scattering of neutrons and the heavy metal elements as well as captured γ rays emitted when γ rays are absorbed in a light element such as hydrogen or boron, are also intercepted at the same time by the high-density shielding material of this invention.

BRIEF DESCRIPTION OF DRAWING

FIG. 2 shows the shielding effect values found of the shielding material at the positional relationship indicated in FIG. 1 and the predicted shielding effect values calculated by a computer under the same condition as above.

DESCRIPTION OF THE PREFERRED EMBODIMENTS

Figure 1:
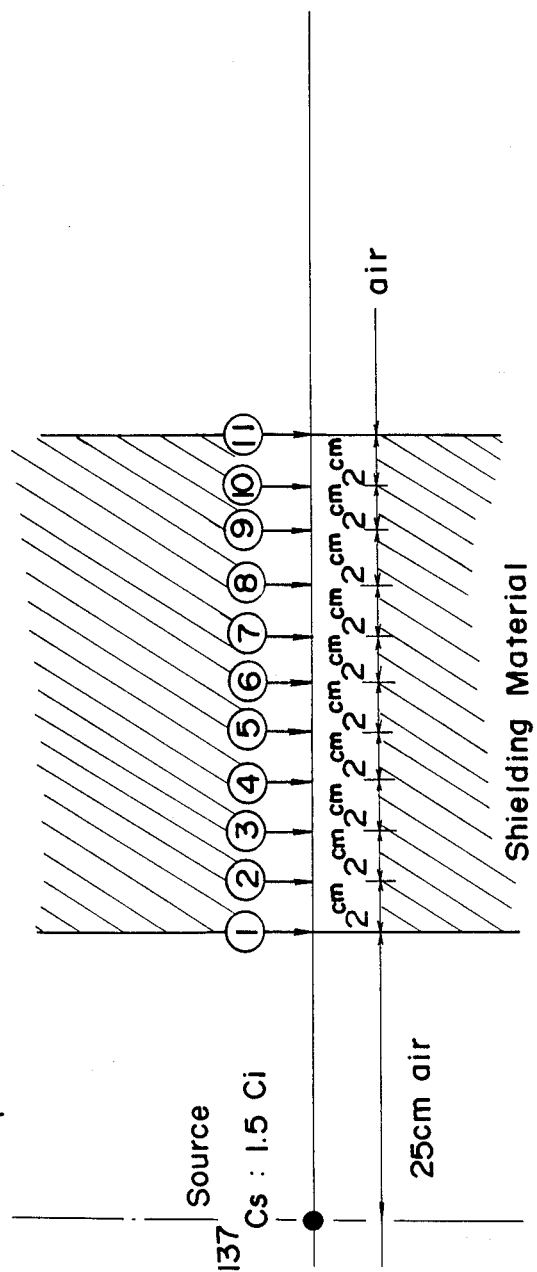
FIG. 1 shows a positional relationship between a radiation shielding material of this invention and a source of radiation.

This invention will be better understood by the following Examples and Experiments.

EXAMPLES 1-4

There were prepared radiation shielding materials as indicated in Table 1. The starting materials used herein were as follows.

(1) The iron oxide powder was a boehmite-containing hematite type $Fe_2O_3$ which was 92% pure and had a particle size of 150–300 mesh, (2) The sulfur was 98% pure and flaky in form, (3) The lead oxide powder was 99.5% pure and had a particle size ranging from 300 mesh to 4 mesh, (4) The gadolinium oxide powder was 99.5% pure and had a particle size of 150–270 mesh, and (5) The hydrogen-adsorption alloy powder was $Mg_2Ni$ alloy powder which had a specific gravity of 3.2 g/c.c., a hydrogen content of 425 l/Kg and a particle size of about 150 mesh.

The above sulfur was heated for melting, incorporated with the above iron oxide powder while keeping the temperature at 350° C. and then thermally reacted for 30 minutes to obtain a matrix. The molten matrix so obtained was incorporated with the lead oxide powder, the gadolinium oxide powder and the hydrogen-adsorption alloy ($Mg_2Ni$) powder, after which the whole was thoroughly mixed under agitation, maintained at 320° C. for 30 minutes, poured into a mold and then cooled for solidification thus obtaining radiation shielding material in the form of a plate.

TABLE 1

| Example | (Unit: wt. %) | | | |
|---|---|---|---|---|
| | Example 1 | Example 2 | Example 3 | Example 4 |
| Sulfur | 32.0 | 26.3 | 22.2 | 19.3 |
| Iron oxide | 22.0 | 18.5 | 15.5 | 13.2 |
| Lead oxide | 38.0 | 38.2 | 38.3 | 38.5 |
| Gadolinium oxide | 5.5 | 9.5 | 13.0 | 15.5 |
| Hydrogen-adsorption alloy | 2.5 | 7.5 | 11.0 | 13.5 |
| Total | 100 | 100 | 100 | 100 |

EXPERIMENT 1

There were prepared a few radiation shielding materials (each in the form of a plate) having the composition of Example 3 and varying from 20 mm to 80 mm in thickness The shielding plates so prepared were each measured three times for their capability (shielding effect) of intercepting γ rays or neutrons by using $^{241}$Am—Be, 8Ci, which was a closed source of radiation, as the source of radiation. The results are shown together with average values in Table 2. For reference, a shielding (intercepting) test was repeated three times in case of using no shielding plates, and the results are also shown together with average values in Table 2.

The method for measurement in this case was carried out as follows.
  The distance from the source of radiation to the device for the measurement (open air): 400 mm
  The Device for measurement: neutron: Studsvic Neutron Dose Meter 2202D
  γ rays: GM Survey Meter 2202D
  Background:
    n: <0.1 mrem/hr
    γ: <0.02 mrem/hr

TABLE 2

| Radiation shielding plate | Thickness of plate (mm) | Neutron (mrem/h) | | | γ rays (mrem/h) average value |
|---|---|---|---|---|---|
| | | 1st time | 2nd time | 3rd time | |
| Non-use of plate | — | 5.32 | 5.23 | 5.52 | 1.6 |
| Plate of Example 3 | 20 | 4.11 | 3.94 | 4.05 | 1.3 |
| " | 40 | 3.11 | 3.12 | 3.14 | 0.9 |
| " | 60 | 2.67 | 2.70 | 2.64 | 0.7 |
| " | 80 | 2.11 | 2.09 | 1.96 | 0.5 |

As is apparent from Table 2, the radiation shielding plates of Example 3 exhibited substantial shielding effects against γ rays and neutrons as compared with the experiments in the absence of shielding materials.

EXPERIMENT 2

In the same manner as in Experiment 1, the shielding plates of Example 3 respectively having thicknesses of 20 mm and 40 mm were tested for their capability (shielding effect) of intercepting γ rays and neutrons by using $^{252}$Cf, 30μCi as the source of radiation. The results are as shown in Table 3. There are also shown in Table 3 the results obtained by using concrete and water bodies respectively having thicknesses of 20 mm and 40 mm as the conventional shielding materials. The results obtained in the absence of shielding materials are further shown in Table 3.

A method for measurement in this case is as follows.
  Size of specimens of shielding material: 200×200×20 mm and 200×200×40 mm
  Distance from a source of radiation to a device for measurement: 500 mm
  The device for measurement: neutron: Studsvic Neutron Dose Meter 2202D
  γ rays: GM Survey Meter 15202
  Background:
    n: <0.1 mrem/h
    γ: <0.02 mrem/h

TABLE 3

| Radiation shielding material | Thickness of specimen (mm) | Neutron (mrem/h) | γ rays (mrem/h) |
|---|---|---|---|
| Non-use of shielding material | — | 0.40 | 0.08 |
| Shielding material of Example 3 | 20 | 0.35 | 0.04 |
| " | 40 | 0.32 | 0.03 |
| Concrete | 20 | 0.39 | 0.07 |
| Concrete | 40 | 0.36 | 0.06 |
| Water | 20 | 0.38 | 0.08 |
| Water | 40 | 0.34 | 0.08 |

As is shown in Table 3, it is seen that the radiation shielding materials of Example 3 have a high capability (shielding effect) of intercepting both neutrons and γ rays as compared with the concrete and water bodies as the shielding materials.

EXPERIMENT 3

The radiation shielding materials obtained in Examples 1–4 and concrete were tested for their properties which were density, compression strength, waterproof property and chemicals resistance by the use of the following method. The results are as shown in Table 4.

[The test method]

(1) Compression strength:
  In accordance with the standard method, the radiation shielding materials and concrete were cast into columns having a size, 100 mmφ×200 mm high, after which the thus obtained columns were tested for compression strength by the use of an Amsler tester. Three columns of each of the shielding materials and concrete were tested for each of said properties and the average values were indicated in Table 4.

(2) Waterproof property:
  Three samples (each having a size 50×50×20 mm) of each of the shielding materials of Examples 1–4 and concrete were prepared and were then each immersed in a beaker filled with 300 c.c. of natural water (well water having a pH of 6.8).
  The samples so immersed were withdrawn from the beaker 48 months later, freed from the water attached to the surface thereof with a filter paper, weighed, dried at a constant temperature of 60° C. for 30 minutes, allowed to cool and then weighed to find a difference in weight between the sample freed from the water on the surface and that dried and cooled mentioned above.
  The difference was deemed to be water absorbability.

(3) Chemicals resistance:
  Three of samples each having a size, 50×50×20 mm, prepared in the same manner as in the above "(2) Waterproof property" were each immersed in a 500 c.c. beaker filled with 300 c.c. of a 5% H₂SO₄ solution and then allowed to stand at normal temperature in a room, while other three of the samples were each immersed in a 500 c.c. beaker filled with 300 c.c. of a 5% HCl solution and then allowed to stand at normal temperature in a room.

The samples so immersed were each taken out of the beaker 12 months later, immersed in pure water for 10 minutes, taken out of the pure water, dried at a constant temperature of 60° C. for 30 minutes, allowed to cool and then weighed to find a difference in weight between the original weight before the immersion and the post-immersion weight obtained above

TABLE 4

| Properties of radiation shielding material | Example 1 | Example 2 | Example 3 | Example 4 | Concrete |
| --- | --- | --- | --- | --- | --- |
| Density (g/c.c.) | 3.2 | 3.5 | 3.8 | 4.0 | 2.75 |
| Compression strength (Kgw/cm²) | 370 | 395 | 418 | 425 | 185 |
| Hydrophobicity (Absorbability %) | 0.01 | 0.01 | 0.01 | 0.01 | 4.66 |
| Chemicals resistance | | | | | |
| H₂SO₄ (wt. loss %) | 1.28 | 1.20 | 1.18 | 1.15 | 22.85 |
| HCl (wt. loss %) | 2.85 | 2.80 | 2.02 | 1.82 | 28.45 |

As is apparent from Table 4, the radiation shielding materials obtained in Examples 1–4 are twice as high as the concrete in compression strength and are very excellent in waterproof property and chemicals resistance as compared with the latter. Thus, the shielding materials of this invention are those which have been enhanced in corrosion resistance without incurring an increase in cost, and they are quite unlikely to cause secondary contamination.

EXPERIMENT 4

The shielding material obtained in Example 3 was shaped into plates each having a thickness of 20 mm. Using $^{137}Cs$, 1.5Ci as the source of radiation, the 20 mm-thick plates were arranged so that a first plate was positioned 25 cm away from the source of radiation to measure the first plate for shielding effect against γ rays and then the remaining plates were juxtaposed one after another to vary the total thickness of the plates from 20 mm to 200 mm while measuring the shielding effect against γ rays every increase of 20 mm in thickness as shown in FIG. 2. The results are shown in FIGS. 1 and 2. In addition, the shielding effects of the radiation shielding materials of this invention under the same conditions as above, which were predicted by a computer using ANISN CODE, are also shown in said Figures.

It is seen from FIGS. 1–2 that the values found (experimental values) well agree with those calculated (theoretical values), are somewhat lower than the latter and provide highly reliable data for engineers' designs.

EFFECTS OF THE INVENTION

The radiation shielding material of this invention is capable of intercepting γ rays, x rays and neutrons at the same time, while the conventional radiation shielding material requires a combination of two shielding components, one component being a highly massive substance, such as concrete, against γ rays and x rays, the other being an entirely different substance, such as water, paraffin or polyethylene, against neutrons. The radiation shielding material of this invention does not require such two shielding components, and, therefore, if the radiation shielding material of this invention is attached, in a suitable thickness proportional to the intensity of a radiation source, to a building having a standard structural strength to be constructed, the resulting building having capability of intercepting radiation will not have to be a super weight construction. Further, the use of the novel radiation shielding material of this invention dispenses with conventional large-sized water tanks, combustible paraffin, polyethylene and the like which intercept neutrons, provides a very safe and reasonable construction and is conducive to increasing the earthquake-proofness of buildings using the novel shielding material therein because the buildings are those which are reduced in heavy structure and also to decreasing a construction cost. Furthermore, since the novel shielding material is excellent in chemicals resistance, does not react with water and has high hydrophobicity, it is unlikely to be contaminated with radioactivity and will easily be freed from the contamination by water washing if it should be so contaminated.

Still further, the novel radiation shielding material not only intercepts γ rays and neutrons as the overcoat of a cask for disposing of high-level radioactive waste materials but also would be conducive to the disposal thereof deep in the ground because of its high hydrophobicity and corrosion resistance.

What is claimed is:

1. A radiation shielding material comprising sulfer, $Fe_2O_3$, $Pb_2O_3$, $Gd_2O_3$ and hydrogen-adsorption alloy are present in the respective amounts of 18.5–31.5% by weight, 12.5–22.5% by weight, 38.0–40.0% by weight, 5.5–16.0% by weight and 2.5–14.0% by weight, and wherein the hydrogen-adsorption alloy comprises at least one member selected from the group consisting of MgCa, Mg₂Cu and Mg₂LaNi.

2. The material according to claim 1 wherein the hydrogen-adsorption alloy is Mg₂Ni.

3. The process of preparing a radiation shielding material consisting of the steps of melting sulfer at 150°–410° C., mixing therewith iron oxide powder to thoroughly react the mixture to obtain a molten matrix, incorporating therewith lead oxide (Pb₂O₃) powder, gadolinium oxide (Gd₂O₃) powder and a hydrogen-adsorption alloy which comprises at least one member selected from the group consisting of MgCa, Mg₂Cu, and Mg₂LaNi, the ratios being 18.5–31.5 % of sulfer, 12.5–22.5% of iron oxide, 38.0–40.0% of lead oxide, 5.5–16.0% of gadolinium oxide, 2.5–14.0% of the hydrogen-adsorption alloy by weight and molding the mixture to obtain a radiation shielding material in a predetermined shape.

* * * * *